US011915185B2

(12) United States Patent
Vannitamby et al.

(10) Patent No.: US 11,915,185 B2
(45) Date of Patent: Feb. 27, 2024

(54) SYSTEMS AND METHODS FOR DELIVERY TO A VEHICLE

(71) Applicant: Ford Global Technologies, LLC, Dearborn, MI (US)

(72) Inventors: Shevon Vannitamby, Farmington Hills, MI (US); Chris Michael Kava, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 227 days.

(21) Appl. No.: 17/321,582

(22) Filed: May 17, 2021

(65) Prior Publication Data
US 2022/0366363 A1 Nov. 17, 2022

(51) Int. Cl.
| | |
|---|---|
| *G06Q 10/0832* | (2023.01) |
| *G06Q 10/0833* | (2023.01) |
| *B60R 25/102* | (2013.01) |
| *B60R 25/24* | (2013.01) |
| *B60R 25/30* | (2013.01) |
| *G06K 7/14* | (2006.01) |
| *B60R 25/01* | (2013.01) |

(52) U.S. Cl.
CPC ......... *G06Q 10/0832* (2013.01); *B60R 25/01* (2013.01); *B60R 25/102* (2013.01); *B60R 25/24* (2013.01); *B60R 25/305* (2013.01); *G06K 7/1417* (2013.01); *G06Q 10/0833* (2013.01); *B60R 2325/205* (2013.01)

(58) Field of Classification Search
CPC ............ G06Q 10/083; G06Q 10/0832; G06Q 10/0833; G06Q 10/0835; G06Q 10/0837; G06Q 10/0838
See application file for complete search history.

(56) References Cited

U.S. PATENT DOCUMENTS

| | | | |
|---|---|---|---|
| 2016/0096508 A1* | 4/2016 | Oz ........................ | H04L 67/125 |
| | | | 701/36 |
| 2016/0099927 A1 | 4/2016 | Oz et al. | |
| 2016/0284149 A1* | 9/2016 | Espig ................. | G07C 9/00182 |
| 2017/0017920 A1* | 1/2017 | Stark ................ | G06K 19/06037 |
| 2017/0024693 A1* | 1/2017 | Wiechers ................. | G07C 9/27 |
| 2017/0230831 A1* | 8/2017 | Canis ................. | H04W 12/082 |
| 2019/0005445 A1 | 1/2019 | Bahrainwala et al. | |
| 2019/0122325 A1* | 4/2019 | Qiu ........................ | B60N 3/104 |
| 2019/0122527 A1* | 4/2019 | Qiu ........................... | B60P 3/20 |
| 2019/0205818 A1 | 7/2019 | Sakurada et al. | |
| 2020/0074396 A1* | 3/2020 | Boccuccia ........... | G06Q 10/083 |

FOREIGN PATENT DOCUMENTS

GB 2558601 A * 7/2018 ............. B60R 25/24

OTHER PUBLICATIONS

Reyes, Damián, Martin Savelsbergh, and Alejandro Toriello. "Vehicle routing with roaming delivery locations." Transportation Research Part C: Emerging Technologies 80 (2017): 71-91. (Year: 2017).*
Andrew J. Hawkins, "Amazon will now deliver packages to the trunk of your car", The Verge, Vox Media, LLC, Apr. 24, 2018, 7 pages.

* cited by examiner

*Primary Examiner* — Emmett K. Walsh
(74) *Attorney, Agent, or Firm* — Brandon Hicks; Eversheds Sutherland (US) LLP

(57) ABSTRACT

The systems and methods disclosed herein are configured to securely deliver items to a vehicle. In particular, a delivery is authenticated before access is provided to the vehicle.

15 Claims, 3 Drawing Sheets

SYSTEMS AND METHODS FOR DELIVERY TO A VEHICLE

BACKGROUND

Many packages are delivered to a front door. To improve security of package deliveries, a customer may choose to have the packages delivered to a vehicle. However, some customers may be wary of providing access to their vehicle to delivery drivers. It is with respect to these and other considerations that the disclosure made herein is presented.

DESCRIPTION OF THE FIGURES

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The systems and methods disclosed herein are configured to securely deliver items to a vehicle. In particular, a delivery is authenticated before access is provided to the vehicle.

Figure 1:
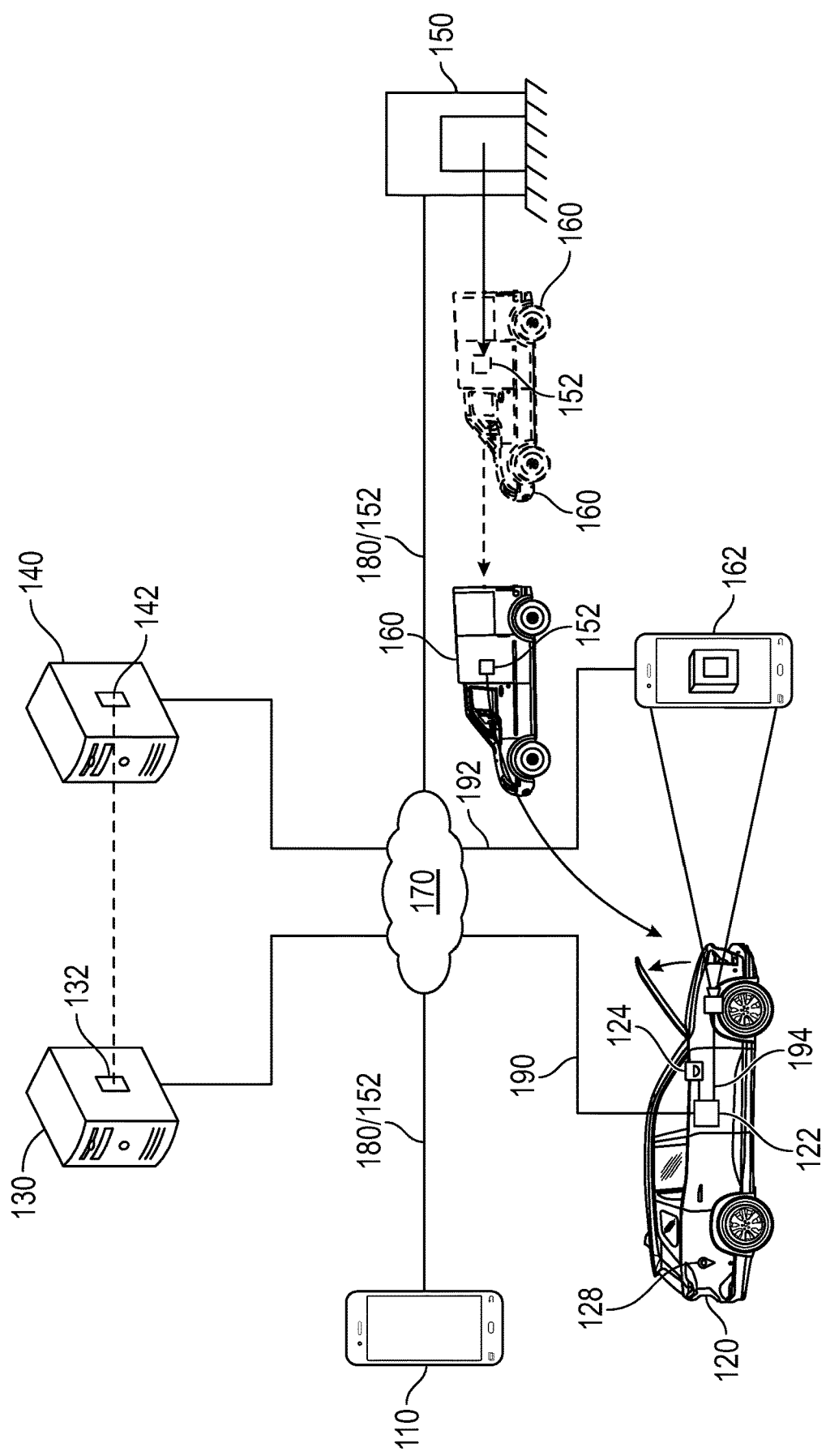
FIG. 1 depicts a system for delivery to a vehicle in accordance with the present disclosure.

Referring to FIG. 1, a system 100 includes a customer mobile device 110; a connected vehicle 120 including a vehicle computer 122, a locking system 124, and a camera 126; a connected vehicle server 130 including a connected vehicle account 132; delivery server 140 including a delivery account 142; a warehouse 150 including items 152; a delivery vehicle 160 and a delivery mobile device 162.

The vehicle 120 has a vehicle location 128.

The servers 130, 140, the mobile devices 110, 120, the vehicle computer 122, and the warehouse 150 are configured to communicate over a network 170. Vehicle systems of the connected vehicle 120, such as the locking system 124, can be remotely controlled over the network 170. For example, the customer mobile device 110 may be used to control features of the connected vehicle 120 such as remote lock and unlock, remote start, and the like.

The connected vehicle 120 may include a connected vehicle service plan through which certain connected car services may be provided to the connected vehicle 120 over the network 170 by a third party. For example, the customer has the connected vehicle account 132 through which the connected vehicle server 130 is provided with permissions to communicate with the connected vehicle 120 and to remotely control vehicle systems of the connected vehicle 120 over the network 170. The connected vehicle server 130 may also provide emergency services and vehicle diagnostics.

The delivery account 142 includes customer information for completing a transaction for items 152. For example, the customer information may include a username, password, home address, payment information, and the like. The customer may be able to link the delivery account 142 on the delivery server 140 to the connected vehicle account 132 on the connected vehicle server 130. Linking the accounts may provide the delivery server 140 with permissions to communicate with the connected vehicle 120. In particular, the server 130 is configured to send a code 190 to the connected vehicle 120.

Once the accounts 132, 142 are linked, the system 100 can perform a method to deliver items 152 to the connected vehicle 120. A customer may place an order 180 using the delivery account 142 via the consumer mobile device 110 or another network-connected computer or device. The order 180 may include a number of items 152, an order number, and the like.

The customer may select delivery to the connected vehicle 120 and select a day and time for delivery. The order 180 may include the home address for delivery and request that the connected vehicle 120 is witching a threshold distance of the home address. The delivery server 140 may request the location 128 of the connected vehicle 120 to confirm that the connected vehicle 120 is within a threshold distance of the home address. Alternatively, the delivery server 140 may use the location 128 of the connected vehicle 120 as a delivery location independent of the home address.

Upon receiving the order 180, the delivery server 140 may generate a first code 190 (e.g., a one-time or temporary code) and provide the first code 190 to the connected vehicle 120. The delivery server 140 may encrypt the first code 190 with a public key of the connected vehicle 120 and the vehicle computer 122 may decrypt the encrypted code 190 with a private key of the connected vehicle 120.

The delivery server 140 may provide the order 180 to the warehouse 150 and the items 152 may be loaded on the delivery vehicle 160 and transported to the location 128 of the connected vehicle 120. The consumer may receive an alert on the consumer mobile device 110 on the way to the location 128 and/or at the location 128.

The delivery server 140 may authenticate that the correct items 152 are to be delivered to the correct location 128. For example, the delivery server determines 140 that the delivery mobile device 162 is at the location 128 of the connected vehicle 120 and that the correct items 152 of the order 180 have been pulled from the delivery vehicle 160 by comparing items of shipping labels that have been scanned with the delivery mobile device 162 to the items 152 of the order 180.

Once authenticated, the delivery server 140 provides a second code 192 to the delivery mobile device 162, for example, in the form of a quick response (QR) code. The QR code 192 may be displayed on the delivery mobile device 162.

The connected vehicle 120 is configured to additionally authenticate a delivery and to control the locking system 124 to unlock the connected vehicle 120. To authenticate a delivery, the delivery driver holds the delivery mobile device 162 displaying the QR code 192 up to the camera 126. The camera 126 captures an image 194 of the QR code 192. The vehicle computer 122 may decode the QR code 192 (e.g., using a QR reader) as necessary for comparison to the first code 190 or the image 194 of the QR code 192 may be compared to an image form of the first code 190.

If the second code 192 matches the first code 190, the vehicle computer 122 controls the locking system 124 to unlock the connected vehicle 120 (e.g., unlocks the trunk). The consumer may be notified on the consumer mobile device 110 when the consumer vehicle is unlocked. The items 152 are then loaded into the trunk and the trunk is closed. The connected vehicle 120 may be locked when the delivery is confirmed via the mobile delivery device 162 (e.g., delivery driver may request to lock the connected vehicle 120) and the consumer may be notified on the consumer mobile device 110 that the delivery is complete.

In alternative embodiments, the second code 192 may be a badge or ID associated with the delivery driver and the vehicle computer 122 is configured to read a badge or ID.

In alternative embodiments, a fingerprint sensor on the trunk latch may be used to additionally authenticate a delivery.

These and other advantages of the present disclosure are provided in greater detail herein.

Illustrative Embodiments

The disclosure will be described more fully hereinafter with reference to the accompanying drawings, in which exemplary embodiments of the disclosure are shown, and not intended to be limiting.

Figure 2:
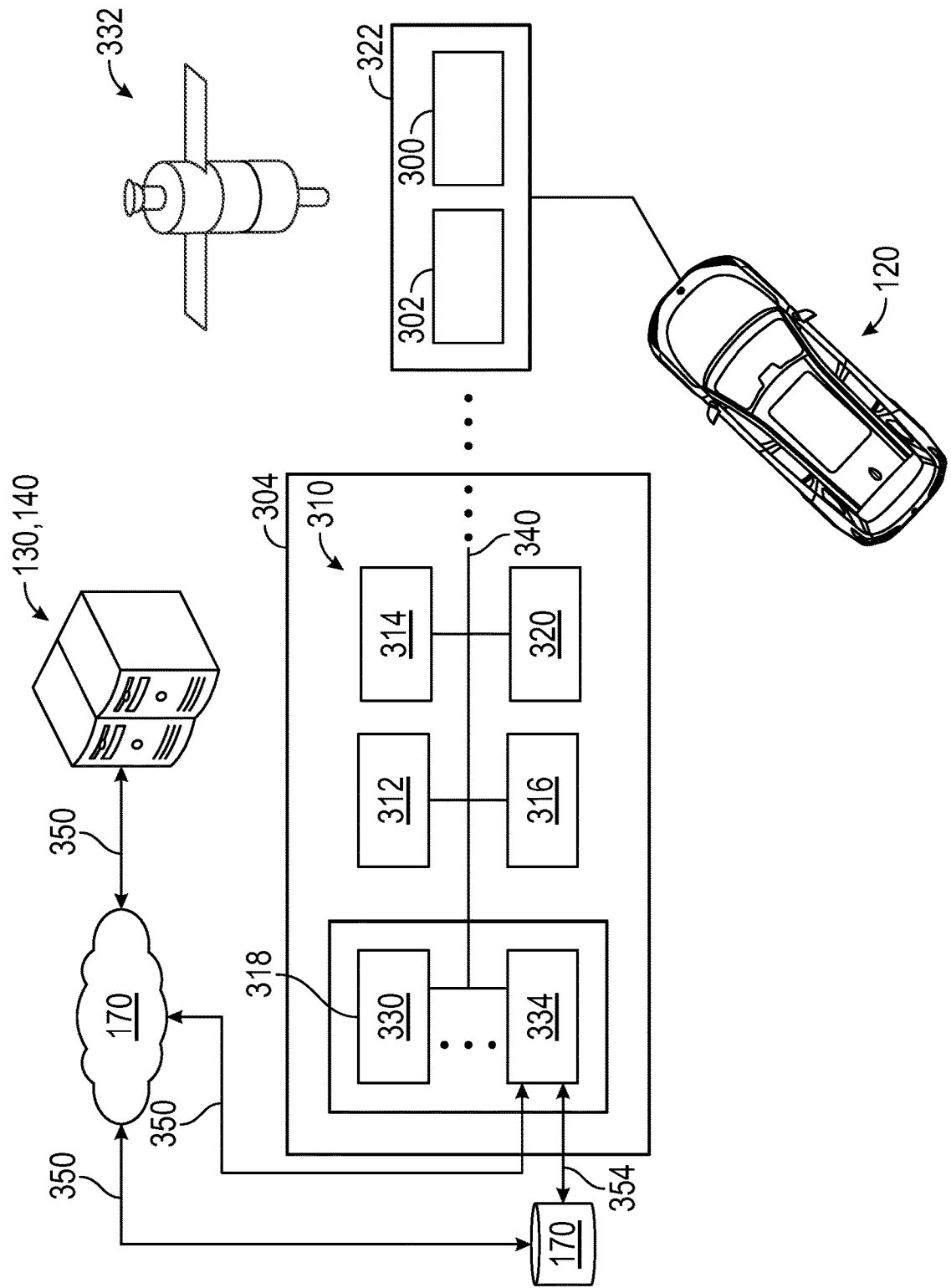
FIG. 2 depicts the system of FIG. 1 in accordance with the present disclosure.

Referring to FIG. 2, the system 100 is described in greater detail.

The vehicle 120 may take the form of a passenger or commercial automobile such as, for example, a truck, a car, a sport utility vehicle, a crossover vehicle, a van, a minivan, a taxi, a bus, etc., and may be configured to include various types of automotive drive systems. Example drive systems can include various types of internal combustion engine (ICE) powertrains having a gasoline, diesel, or natural gas-powered combustion engine with conventional drive components such as, a transmission, a drive shaft, a differential, etc.

In another configuration, the vehicle 100 may be configured as an electric vehicle (EV). More particularly, the vehicle 100 may include a battery EV (BEV) drive system. The vehicle 100 may be configured as a hybrid EV (HEV) having an independent onboard power plant or a plug-in HEV (PHEV) that includes a HEV powertrain connectable to an external power source (including a parallel or series hybrid powertrain having a combustion engine power plant and one or more EV drive systems). HEVs can include battery and/or super capacitor banks for power storage, flywheel power storage systems, or other power generation and storage infrastructure.

The vehicle 100 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

Further, the vehicle 100 may be a manually driven vehicle, and/or be configured to operate in a fully autonomous (e.g., driverless) mode (e.g., level-5 autonomy) or in one or more partial autonomy modes. Examples of partial autonomy modes are widely understood in the art as autonomy Levels 1 through 5.

The vehicle computer 122 includes components including a memory (e.g., memory 300) and a processor (e.g., a processor 302). The customer mobile device 110, connected vehicle server 130, delivery server 140, and delivery mobile device 162 also include a memory and processor. For purposes of teaching, the descriptions of the memory 300 and processor 302 are applicable to the memory and processor of the other elements.

A processor may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs).

A memory may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory includes multiple kinds of memory, particularly volatile memory and non-volatile memory.

Memory is computer readable media on which one or more sets of instructions, such as the software for performing the methods of the present disclosure, can be embedded. The instructions may embody one or more of the methods or logic as described herein. The instructions may reside completely, or at least partially, within any one or more of the memory, the computer readable medium, and/or within the processor during execution of the instructions.

The terms "non-transitory computer-readable medium" and "computer-readable medium" should be understood to include a single medium or multiple media, such as a centralized or distributed database, and/or associated caches and servers that store one or more sets of instructions. The terms "non-transitory computer-readable medium" and "computer-readable medium" also include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

Continuing with FIG. 2, a vehicle control unit (VCU) 304 includes a plurality of electronic control units (ECUs) 310 disposed in communication with the automotive computer 122. The VCU 304 may coordinate the data between vehicle systems, connected servers (e.g., connected vehicle server 130, delivery server 140), and other vehicles operating as part of a vehicle fleet. The VCU 304 may control aspects of the connected vehicle 120, and implement one or more instruction sets received from a vehicle system controller (such as vehicle computer 122).

The VCU 304 can include or communicate with any combination of the ECUs 310, such as, for example, a Body Control Module (BCM) 312, an Engine Control Module (ECM) 314, a Transmission Control Module (TCM) 316, the Telematics Control Unit 318 (TCU), a Restraint Control Module (RCM) 320, and the like. The TCU 318 may be disposed in communication with the ECUs 310 by way of a Controller Area Network (CAN) bus 340. In some aspects, the TCU 318 may retrieve data and send data as a CAN bus 340 node.

The CAN bus 340 may be configured as a multi-master serial bus standard for connecting two or more of the ECUs 310 as nodes using a message-based protocol that can be configured and/or programmed to allow the ECUs 310 to communicate with each other. The CAN bus 340 may be or include a high-speed CAN (which may have bit speeds up to 1 Mb/s on CAN, 5 Mb/s on CAN Flexible Data Rate (CAN FD), and can include a low-speed or fault tolerant CAN (up to 125 Kbps), which may, in some configurations, use a linear bus configuration. In some aspects, the ECUs 310 may communicate with a host computer (e.g., the vehicle computer 122, and/or server(s) 130, 140, etc.), and may also communicate with one another without the necessity of a host computer.

The CAN bus 340 may connect the ECUs 310 with the vehicle computer 122 such that the vehicle computer 122 may retrieve information from, send information to, and otherwise interact with the ECUs 310 to perform steps described according to embodiments of the present disclosure. The CAN bus 340 may connect CAN bus nodes (e.g., the ECUs 310) to each other through a two-wire bus, which may be a twisted pair having a nominal characteristic impedance. The CAN bus 340 may also be accomplished using other communication protocol solutions, such as Media Oriented Systems Transport (MOST) or Ethernet. In other aspects, the CAN bus 340 may be a wireless intra-vehicle CAN bus.

The VCU 304 may control various loads directly via the CAN bus 340 communication or implement such control in conjunction with the BCM 312. The ECUs 310 described with respect to the VCU 304 are provided for exemplary purposes only, and are not intended to be limiting or exclusive. Control and/or communication with other control modules is possible, and such control is contemplated.

The ECUs 310 may control aspects of vehicle operation and communication using inputs from human drivers, inputs from a vehicle system controller, and/or via wireless signal inputs received via wireless channel(s) from other connected devices. The ECUs 310, when configured as nodes in the CAN bus 340, may each include a central processing unit (CPU), a CAN controller, and/or a transceiver.

The TCU 318 can be configured to provide vehicle connectivity to wireless computing systems onboard and offboard the vehicle 120 and is configurable for wireless communication between the vehicle 120 and other systems, computers, mobile devices 110, servers 130, 140, and modules.

The TCU 318 includes a Navigation (NAV) system 330 for receiving and processing a GPS signal from a GPS 332, a Bluetooth® Low-Energy Module (BLEM) 334, a Wi-Fi transceiver, an Ultra-Wide Band (UWB) transceiver, and/or other wireless transceivers described in further detail below for using near field communication (NFC) protocols, Bluetooth® protocols, Wi-Fi, Ultra-Wide Band (UWB), and other possible data connection and sharing techniques.

The NAV system 330 may be configured and/or programmed to determine the vehicle location 128.

The TCU 318 may include wireless transmission and communication hardware that may be disposed in communication with one or more transceivers associated with telecommunications towers and other wireless telecommunications infrastructure. For example, the BLEM 334 may be configured and/or programmed to receive messages from, and transmit messages to, one or more cellular towers associated with a telecommunication provider, and/or and a Telematics Service Delivery Network (SDN) associated with the vehicle 120 for coordinating vehicle fleet.

The BLEM 334 may establish wireless communication using Bluetooth® and Bluetooth Low-Energy® communication protocols by broadcasting and/or listening for broadcasts of small advertising packets, and establishing connections with responsive devices that are configured according to embodiments described herein. For example, the BLEM 334 may include Generic Attribute Profile (GATT) device connectivity for client devices that respond to or initiate GATT commands and requests.

External servers 130, 140 may be communicatively coupled with the vehicle 120 via one or more network(s) 170, which may communicate via one or more wireless channel(s) 350. The wireless channel(s) 350 are depicted in FIG. 2 as communicating via the one or more network(s) 170.

The mobile device 110 may be connected via direct communication (e.g., channel 354) with the vehicle 120 using near field communication (NFC) protocols, Bluetooth® protocols, Wi-Fi, Ultra-Wide Band (UWB), and other possible data connection and sharing techniques.

The network(s) 170 illustrate example communication infrastructure in which the connected devices discussed in various embodiments of this disclosure may communicate. The network(s) 170 may be and/or include the Internet, a private network, public network or other configuration that operates using any one or more known communication protocols such as, for example, transmission control protocol/Internet protocol (TCP/IP), Bluetooth®, Wi-Fi based on the Institute of Electrical and Electronics Engineers (IEEE) standard 802.11, WiMAX (IEEE 802.16m), Ultra-Wide Band (UWB), and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), Universal Mobile Telecommunications System (UMTS), Long Term Evolution (LTE), and the like.

The BCM 312 generally includes an integration of sensors, vehicle performance indicators, and variable reactors associated with vehicle systems, and may include processor-based power distribution circuitry that can control functions associated with the vehicle body such as lights, windows, security, camera 126, the locking system 124 (e.g., door locks and access control), and various comfort controls. The BCM 312 may also operate as a gateway for bus and network interfaces to interact with remote ECUs.

The BCM 312 may coordinate any one or more functions from a wide range of vehicle functionality, including energy management systems, alarms, vehicle immobilizers, driver and rider access authorization systems, Phone-as-a-Key (PaaK) systems, driver assistance systems, Autonomous Vehicle (AV) control systems, power windows, doors, actuators, and other functionality, etc.

The BCM 312 may be configured for vehicle energy management, exterior lighting control, wiper functionality, power window and door functionality, heating ventilation and air conditioning systems, and driver integration systems. In other aspects, the BCM 312 may control auxiliary equipment functionality, and/or is responsible for integration of such functionality. In one aspect, a vehicle having a vehicle control system may integrate the system using, at least in part, the BCM 312. For example, the BCM 312 may be used to control vehicle systems according to the mode message 192.

Vehicle systems of the connected vehicle 120, such as the locking system 124, can be remotely controlled over the network 170. For example, the customer mobile device 110 may be used to control features of the connected vehicle 120 such as remote lock and unlock, remote start, and the like.

The connected vehicle 120 may include a connected vehicle service plan through which certain connected car services may be provided to the connected vehicle 120 over the network 170 by a third party. For example, the customer has the connected vehicle account 132 through which the connected vehicle server 130 is provided with permissions to communicate with the connected vehicle 120 and to remotely control vehicle systems of the connected vehicle 120 over the network 170. The connected vehicle server 130 may also provide emergency services and vehicle diagnostics.

The delivery account 142 includes customer information for completing a transaction for items 124. For example, the customer information may include a username, password, home address, payment information, and the like. The customer may be able to link the delivery account 142 on the delivery server 140 to the connected vehicle account 132 on the connected vehicle server 130. Linking the accounts may provide the delivery server 140 with permissions to communicate with the connected vehicle 120. In particular, the server 130 is configured to send the first code 190 to the connected vehicle 120.

Once the accounts 132, 142 are linked, the system 100 can perform a method to deliver items 152 to the connected vehicle 120.

Figure 3:
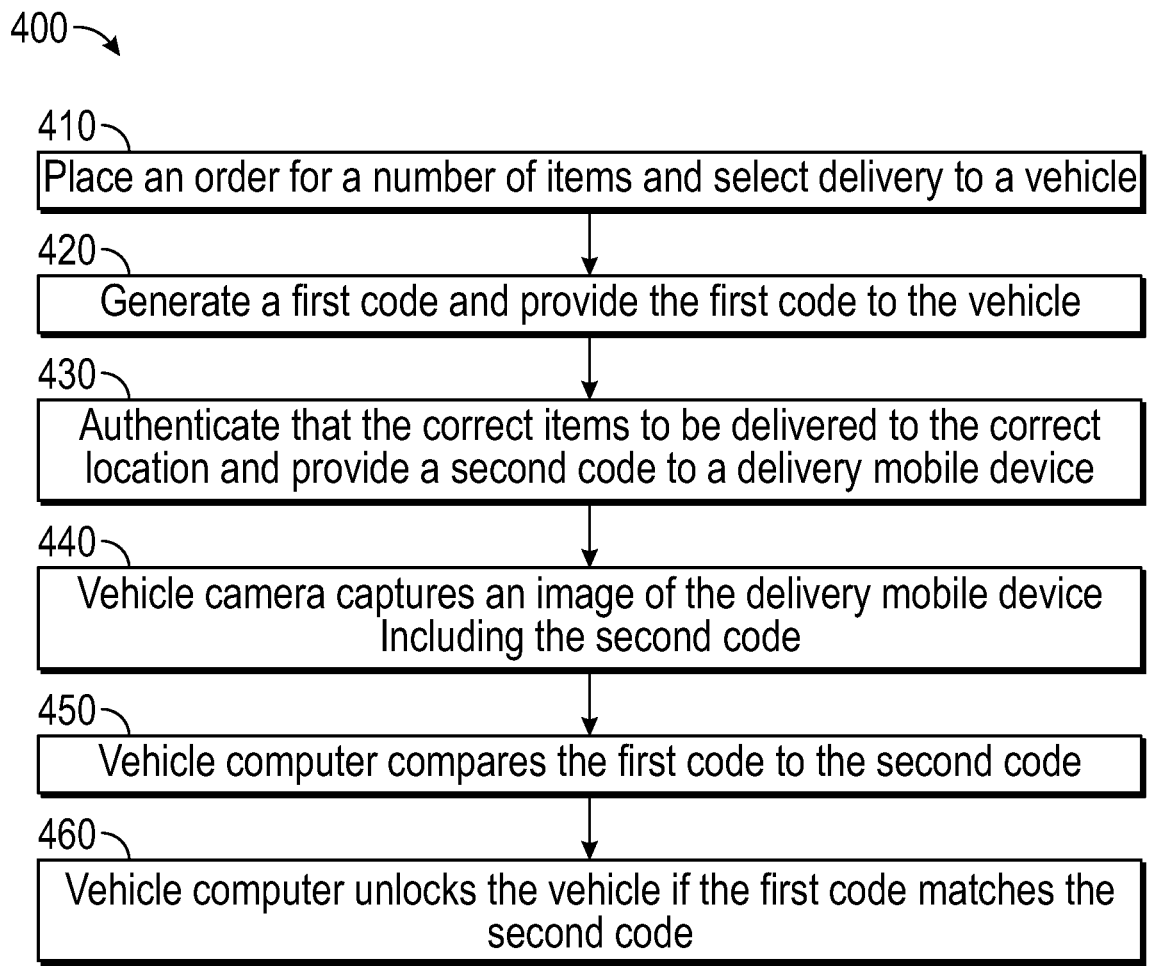
FIG. 3 depicts a method in accordance with the present disclosure.

Referring to FIG. 3, according to a first step 410 of an exemplary method 400, a customer may place an order 180 using the delivery account 142 via the consumer mobile device 110 or another network-connected computer or device. The order 180 may include a number of items 152 and an order number.

The customer may select delivery to the connected vehicle 120 and select a day and time for delivery. The order 180 may include the home address for deliver and request that the connected vehicle 120 is witching a threshold distance of the home address. The delivery server 140 may request the location 128 of the connected vehicle 120 to confirm that the connected vehicle 120 is within a threshold distance of the home address. Alternatively the delivery server 140 may use the location 128 of the connected vehicle 120 as a delivery location independent of the home address.

According to a second step 420, upon receiving the order 180, the delivery server 140 may generate a first code 190 (e.g., a one-time or temporary code) and provide the first code 190 to the connected vehicle 120. The delivery server 140 may encrypt the first code 190 with a public key of the connected vehicle 120 and the vehicle computer 122 may decrypt the encrypted code 190 with a private key of the connected vehicle 120.

The delivery server 140 may provide the order 180 to the warehouse 150 and the items 124 may be loaded on the delivery vehicle 160 and transported to the location 128 of the connected vehicle 120. The consumer may receive an alert on the consumer mobile device 110 on the way to the location 128 and/or at the location 128.

According to a third step 430, the delivery server 140 may authenticate that the correct items 152 are to be delivered to the correct location 128. For example, the delivery server 140 determines that the delivery mobile device 162 is at the location 128 of the connected vehicle 120 and that the correct items 152 of the order 180 have been pulled from the delivery vehicle 160. For example, the delivery server 140 compares items identified by scanning shipping labels with the delivery mobile device 162 to the items 124 of the order 180.

Once authenticated, the delivery server 140 provides a second code 192 to the delivery mobile device 162, for example, in the form of a quick response (QR) code. The QR code 192 may be displayed on the delivery mobile device 162.

The connected vehicle 120 is configured to additionally authenticate a delivery and control the locking system 124 to unlock the connected vehicle 120. To authenticate a delivery of the items 152, the delivery driver holds the delivery mobile device 162 displaying the QR code 192 up to the camera 126.

According to a fourth step 440, the camera 126 captures an image 194 of the delivery mobile device 162 displaying the QR code 192. The vehicle computer 122 may decode the QR code 192 (e.g., using a QR reader) as necessary for comparison to the first code 190 or the image 194 of the QR 192 code may be compared to an image form of the first code 190. According to a fifth step 450, the vehicle computer 122 compares the first code 190 to the second code 192.

According to a sixth step 460, if the second code 192 matches the first code 190, the vehicle computer 122 controls the locking system 124 to unlock the connected vehicle 120 (e.g., unlocks the trunk). The consumer may be notified on the consumer mobile device 110 when the connected vehicle 120 is unlocked. The items 152 are then loaded into the vehicle 120 and the vehicle 120 is closed.

The connected vehicle 120 may be locked when the delivery is confirmed via the mobile delivery device 162 (e.g., delivery driver may request to lock the connected vehicle 120) and the consumer may be notified on the consumer mobile device 110 that the delivery is complete.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A system, comprising:
    a processor; and
    a memory comprising:
        instructions that, when executed by the processor, cause the processor to perform operations comprising:
            receiving, at a vehicle, a first code associated with an order, wherein the first code is a temporary code, and wherein the order includes a selection of a day and time for delivery;
            comparing a first location of the vehicle to a second location of at least one of a delivery mobile device of a delivery driver and a delivery vehicle, wherein the first location is a home address and the vehicle is within a threshold distance of the home address;
            comparing at least one item that is scanned by the delivery mobile device to at least one item in the order;
            sending, based on the first location matching the second location and based on the at least one item that is scanned by the delivery mobile device matching the at least one item in the order, a second code to the delivery mobile device;
            capturing, with a camera of the vehicle, an image of an employee badge or identification of the delivery driver including a second code;
            comparing the first code to the second code;
            determining a verification of the delivery driver using a fingerprint sensor on the vehicle;
            unlocking, based on the first code matching the second code, the vehicle and the verification of the delivery driver using the fingerprint sensor;
            sending an alert to a consumer device to confirm the step of unlocking the vehicle; and
            locking the vehicle in response to receiving a confirmation of delivery.

2. The system of claim 1, wherein the instructions further cause the processor to perform operations comprising comparing at least one item that is scanned by the delivery mobile device to at least one item in the order; and
    sending, based on the at least one item that is scanned by the delivery mobile device matching the at least one item in the order, the second code to the delivery mobile device.

3. The system of claim 1, wherein the second code is a QR code.

4. The system of claim 3, wherein the image includes the second code.

5. The system of claim 1, wherein the instructions further cause the processor to perform operations comprising generating, in response to receiving the order, the first code.

6. The system of claim 5, wherein the order includes a selection for delivery to the vehicle.

7. The system of claim 6, wherein the order includes a number of items.

8. The system of claim 6, wherein the order includes a selection of a day and time for delivery.

9. The system of claim 1, wherein the instructions further cause the processor to perform operations comprising sending an alert to a consumer device to confirm the step of unlocking the vehicle.

10. A vehicle, comprising:
    a camera;
    a locking system;
    a processor; and
    a memory comprising:
        instructions that, when executed by the processor, cause the processor to perform operations comprising:
            receiving a first code associated with an order, wherein the first code is a temporary code, and wherein the order includes a selection of a day and time for delivery;
            comparing a first location of the vehicle to a second location of at least one of a delivery mobile device of a delivery driver and a delivery vehicle, wherein the first location is a home address and the vehicle is within a threshold distance of the home address;
            comparing at least one item that is scanned by the delivery mobile device to at least one item in the order;
            sending, based on the first location matching the second location and based on the at least one item that is scanned by the delivery mobile device matching the at least one item in the order, a second code to the delivery mobile device;
            capturing, with the camera, an image of an employee badge or identification of the delivery driver including a second code;
            comparing the first code to the second code;
            determining a verification of the delivery driver using a fingerprint sensor on the vehicle;
            unlocking, using the locking system, the vehicle if the first code matches the second code and the verification of the delivery driver using the fingerprint sensor;
            sending an alert to a consumer device to confirm the step of unlocking the vehicle; and
            locking the vehicle in response to receiving a confirmation of delivery.

11. The vehicle of claim 10, wherein the second code is a QR code.

12. The vehicle of claim 10, wherein the image includes the second code.

13. The vehicle of claim 10, further comprising a navigation system configured to determine a location of the vehicle.

14. The vehicle of claim 10, further comprising instructions that, when executed by the processor, cause the processor to perform operations comprising receiving a confirmation to unlock the vehicle.

15. A method comprising:
  receiving, at a vehicle, a first code associated with an order, wherein the first code is a temporary code, and wherein the order includes a selection of a day and time for delivery;
  comparing a first location of the vehicle to a second location of at least one of a delivery mobile device of a delivery driver and a delivery vehicle, wherein the first location is a home address and the vehicle is within a threshold distance of the home address;
  comparing at least one item that is scanned by the delivery mobile device to at least one item in the order;
  sending, based on the first location matching the second location and based on the at least one item that is scanned by the delivery mobile device matching the at least one item in the order, a second code to the delivery mobile device;
  capturing, with a camera of the vehicle, an image of an employee badge or identification of the delivery driver including a second code;
  comparing the first code to the second code;
  determining a verification of the delivery driver using a fingerprint sensor on the vehicle;
  unlocking, based on the first code matching the second code and the verification of the delivery driver using the fingerprint sensor, the vehicle;
  sending an alert to a consumer device to confirm the step of unlocking the vehicle; and
  locking the vehicle in response to receiving a confirmation of delivery.

* * * * *